United States Patent
Kogan et al.

(10) Patent No.: US 6,744,524 B1
(45) Date of Patent: Jun. 1, 2004

(54) METHOD AND APPARATUS FOR CALIBRATING A FABRY-PEROT INTERFEROMETER BASED MEASUREMENT SYSTEM

(75) Inventors: Yakov Kogan, Bedford, MA (US); Reich L. Watterson, Lexington, MA (US); Donald L. McDaniel, North Andover, MA (US)

(73) Assignee: Nortel Networks Limited, St. Laurent (CA)

( * ) Notice: Subject to any disclaimer, the term of this patent is extended or adjusted under 35 U.S.C. 154(b) by 178 days.

(21) Appl. No.: 10/103,416

(22) Filed: Jun. 3, 2002

(51) Int. Cl.$^7$ .................................................. G01B 9/02
(52) U.S. Cl. .................................................... 356/519
(58) Field of Search .................................. 356/454, 519

(56) References Cited

U.S. PATENT DOCUMENTS 5,450,207 A * 9/1995 Fomenkov .................. 356/416
6,611,341 B2 * 8/2003 May ............................ 356/519

* cited by examiner

*Primary Examiner*—Samuel A. Turner
*Assistant Examiner*—Michael A. Lyons
(74) *Attorney, Agent, or Firm*—Christopher J. Cianciolo; Raul C. Hashim

(57) ABSTRACT

A method and apparatus is provided for calibrating a Fabry-Perot etalon based optical measurement system. The calibration is performed by analyzing the shape of transmission peaks output from the etalon in response to a known optical signal and using that information, along with a formula that approximates the response of the etalon, to perform the calibration.

12 Claims, 5 Drawing Sheets

METHOD AND APPARATUS FOR CALIBRATING A FABRY-PEROT INTERFEROMETER BASED MEASUREMENT SYSTEM

BACKGROUND OF THE INVENTION

As it is known in the telecommunications art, dense wavelength division multiplexing (DWDM) is a technology that allows many wavelengths of light to travel along the same fiberoptic cable. Each of those wavelengths of light convey a stream of data that is filtered and decoded when it reaches an optical DWDM receiver. DWDM technology significantly increases the amount of data that can be conveyed, at a single time, across a fiberoptic cable and hence is becoming highly utilized.

DWDM systems typically include equipment to monitor the optical signals communicated thereon to determine, among other characteristics, their wavelength and intensity. Such monitors are typically referred to as optical spectrum analyzers. Fixed and tunable Fabry-Perot interferometers, characterized by narrow passband periodic transmission functions, are used as wavelength etalons in these optical spectrum analyzers. Such interferometers are also utilized in wavelength tunable lasers that drive the DWDM signals.

There are two widely used measurement schemes, involving Fabry-Perot cavities, referred to as the static scheme and the dynamic scheme. With respect to the static scheme, broadband or laser light transmitted through a fixed Fabry-Perot cavity forms an interference pattern. The wavelength and intensity of light under test are judged by the form and shape of the resultant optical signal, taking into account fixed transmission characteristic of the cavity. In the dynamic scheme, the optical path in the Fabry-Perot cavity is dynamically changed by adjusting the incidence angle of light or by adjusting the spacing between the mirrors. In the dynamic scheme, the input light forms a dynamically changing interference pattern and the properties of the light are judged by the resultant dynamic optical signal.

Both methods require prior determination of the transmission function of the Fabry-Perot interferometer being utilized. The accuracy of the measurement is dependent upon how precisely that transmission function is known and how stable it is. The stability of the transmission function is highly dependent on the physical characteristics of the Fabry-Perot cavity. These physical characteristics are highly susceptible to environmental changes and, therefore, the accuracy of the above-mentioned methods are significantly dependent thereon.

Accordingly, an algorithmic mechanism is needed for providing accurate and reliable measurements across wide operating and environmental ranges.

SUMMARY OF THE INVENTION

In accordance with an aspect of the present invention, an algorithmic method and apparatus is provided for improving the accuracy of Fabry-Perot based measurement systems by performing the calibration of the cavity transmission function and introducing the correction into the measurement results.

In one embodiment of the present invention, a method for calibrating an etalon based optical system includes the steps of applying an optical signal having a known spectral shape to the etalon. The resulting transmission peaks are recorded and analyzed at selected points, in the wavelength domain. Accordingly, the centre wavelength, peak transmission and full-width-half-max parameters are determined. The center wavelength, peak transmission and full-width-half-max parameters are subsequently applied to a formula that approximates the response of the etalon such that the etalon is calibrated.

In a further embodiment of the present invention, the peak transmission is determined by performing a least square fit of the shape of the resulting transmission peaks to the aforementioned formula.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DESCRIPTION OF A PREFERRED EMBODIMENT

Figure 1:
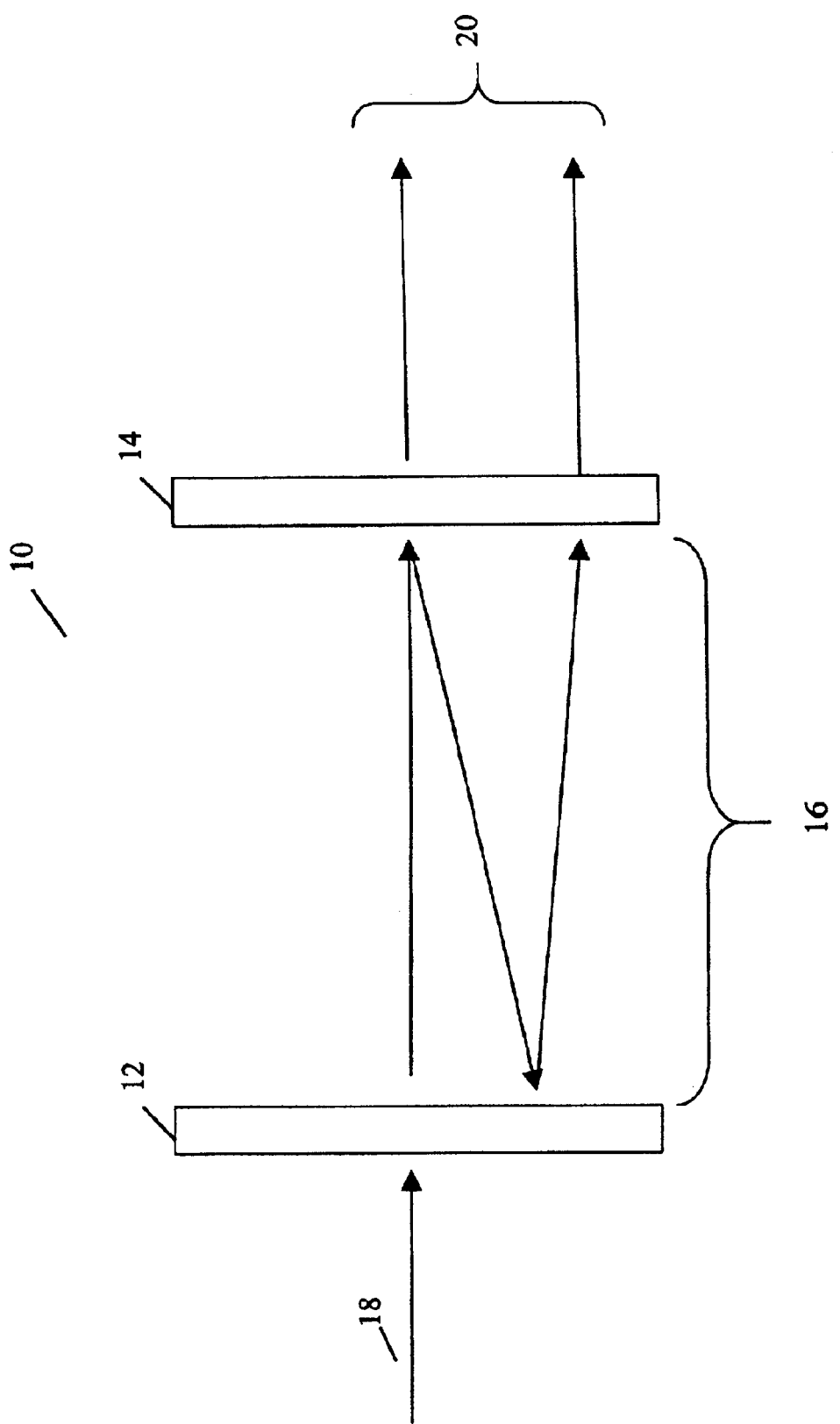
FIG. 1 depicts aspects of a Fabry-Perot Etalon.

Referring to FIG. 1, a Fabry-Perot Etalon 10 is shown to include a parallel pair of mirrors 12 and 14 forming a Fabry-Perot cavity 16. Each of the mirrors has a very high, but not perfect, reflectance value (R) such that a high percentage of incident light is reflected back into the cavity 16. A small percentage of the incident light is transmitted through the mirror. In a typical operation, an optical signal 18 is transmitted through one of the mirrors, for example mirror 12. When the optical signal is incident on mirror 14, a portion is reflected away from mirror 14 and another, smaller, portion is transmitted through mirror 14. The portion that is reflected travels through the cavity 16 and is incident on mirror 12. Again, a portion of this signal is transmitted and another portion is reflected. The reflected signal travels through cavity 16 and is incident on mirror 14. This reflectance/transmission pattern continues such that there are many reflections occurring within cavity 16 and many signals 20 being transmitted through mirror 14. The signals 20 that are at a resonant wavelength of cavity 16 (i.e. those signals having a wavelength that is an integral multiple of twice the length of cavity 16) add together constructively in-phase. In other words, only signals 20 that are at resonant wavelengths of cavity 16 will be transmitted from the Fabry-Perot Etalon 10. Accordingly, the transmission function of Fabry-Perot Etalon 10 is a series of peaks, each coinciding with a resonant wavelength.

More specifically, the transmission function of Fabry-Perot Etalon 10 is defined by the following formula:

$$\text{Transmission} = \frac{(1-R)^2}{(1-R)^2 + 4 \cdot R \cdot \left[\sin\left[\frac{(2 \cdot \pi \cdot L \cdot n \cdot \cos(\theta))}{\lambda}\right]\right]^2}$$

where R is the power reflectivity of mirrors 12 and 14, L is the spacing between mirrors 12 and 14, n is the refractive index of the material in Fabry-Perot Cavity 16, $\Theta$ is the incidence angle of optical signal 18 with respect to perpendicular and $\lambda$ is the wavelength of optical signal 18. Variations in the transmission over the wavelength region of interest can be caused by changes in the value of R, L, n and/or $\Theta$. The formula identified above reflects the periodic character of the Fabry-Perot cavity transmission based upon transmission of integral multiples of twice the length of cavity 16.

For Fabry-Perot cavities with narrow passbands and high band spacing, as are typically utilized in measurement systems, the formula can be approximated by:

$$\text{Transmission} = \frac{(1-R)^2}{1 + \left[\frac{(2 \cdot (\lambda - \lambda_0))}{FWHM(\lambda_0)}\right]^2}$$

where $_0$ is the center wavelength of the Fabry-Perot Cavity Passband and FWHM is the width of the Fabry-Perot Cavity passband at the point where its value is half of its maximum value. This equation does not reflect the periodic character of the Fabry-Perot transmission function but, rather, describes an individual transmission peak.

Assuming that the reflectivity of mirror 12 and mirror 14 are essentially the same, the term $(1-R)^2$ can be replaced with the value of the transmission function at the center wavelength of cavity 16. Accordingly the transmission formula can be rewritten as follows:

$$\text{Transmission}(\lambda) := \frac{\text{Transmission}(\lambda_0)}{1 + \left[\frac{[2 \cdot (\lambda - \lambda_0)]}{FWHM(\lambda_0)}\right]^2}.$$

This formula, hereinafter referred to as the Transmission Formula, shows that an individual transmission band of Fabry-Perot cavity 16 is well defined if three parameters are known, i.e. the center wavelength of the peak, the transmission at the center wavelength of the peak and the fill width at half maximum value. In other words, the transmission function of Fabry-Perot etalon 10, around any particular center wavelength, can be defined by only two parameters: transmission($\lambda_0$) and FWHM($\lambda_0$). Thus the process of defining the transmission and full width at half maximum of the cavity as fictions of the center wavelength can be referred to as the calibration process of a measurement system utilizing Fabry-Perot Etalon 10.

A convenient method to determine these functions is by recording the transmission of the Fabry-Perot Etalon 10 in response to the wavelengths of optical signals passing through it and then fitting this data to the Transmission Formula for each individual transmission peak. For example, assume that over the wavelength range of =1549.7 nm–1550.7 nm, a tunable Fabry-Perot etalon (i.e. where mirrors 12 and 14 are moveable relative to each other to tune the cavity fin 16 to a desired length) can be described by the following functions:

FWHN($\lambda_0$):=0.02+0.1·($\lambda_0$−1550)

Transmission($\lambda_0$):=0.95−0.5($\lambda_0$−1550)

Knowing the FWHM($\lambda_0$) and Transmission($\lambda_0$), the Fabry-Perot Etalon 10 is tuned across fixed lasers with the following wavelengths: $\lambda_{01}$=1550 nm $\lambda_{02}$=1550.2 nm $\lambda_{03}$=1550.4 mn. The following three equations f1(x), f2(x) and f3(x) describe the results of interference of each of the lasers with the Fabry-Perot Etalon 10, i.e. the Transmission Formula:

$$f1(x) := \frac{\text{Transmission}(x)}{1 + \left[\frac{2 \cdot (x - \lambda 01)}{FWHM(x)}\right]^2}$$

$$f2(x) := \frac{\text{Transmission}(x)}{1 + \left[\frac{2 \cdot (x - \lambda 02)}{FWHM(x)}\right]^2}$$

$$f3(x) := \frac{\text{Transmission}(x)}{1 + \left[\frac{2 \cdot (x - \lambda 03)}{FWHM(x)}\right]^2}.$$

The superposition of the three interference patterns, such as can be recorded by a photodetector synchronized with the tunable etalon, will hereinafter be referred to as F(x).

Figure 2:
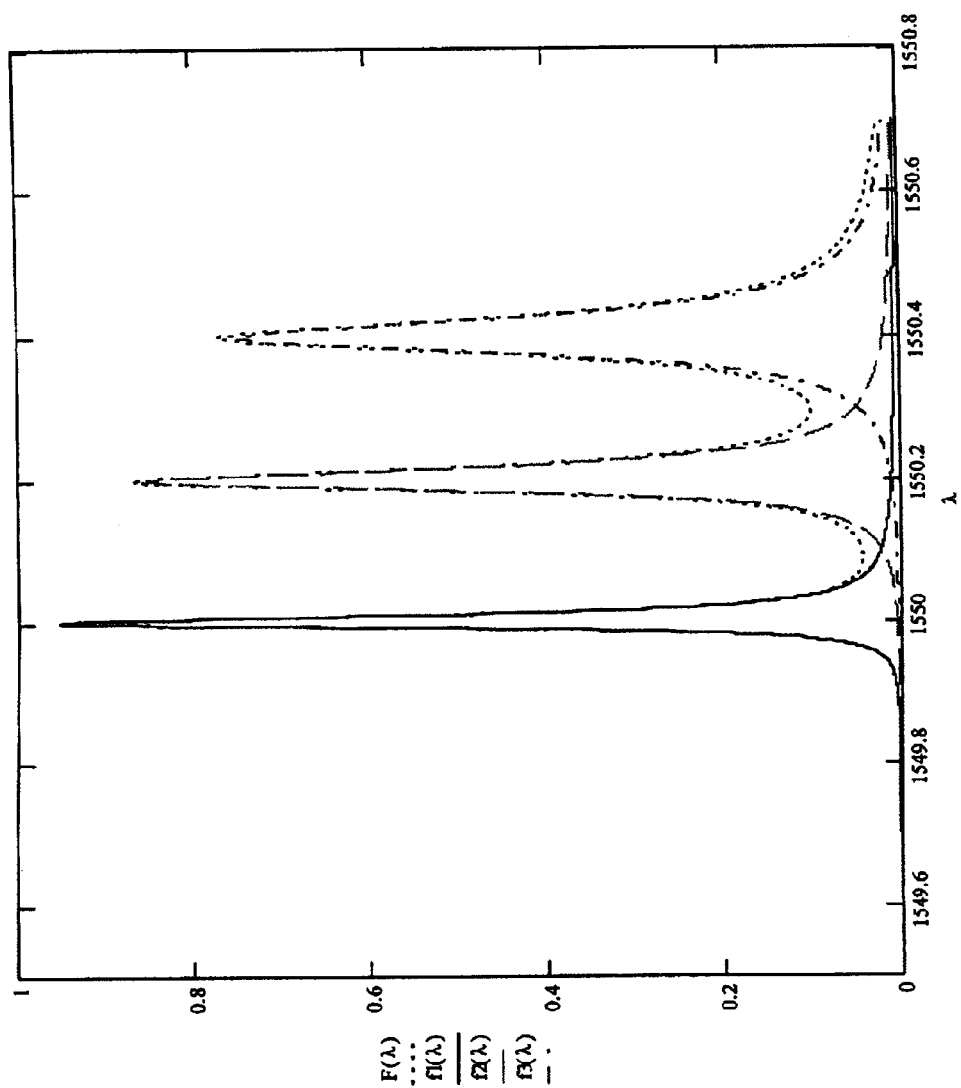
FIG. 2 depicts shows the convolution of the transmission function of the tunable Fabry-Perot etalon of FIG. 1 with the three fixed wavelength lasers.

FIG. 2 shows the convolution of the transmission function of wavelength tunable Fabry-Perot etalon 10 (described by the functions mentioned above) with the three fixed wavelength lasers. Assume that it is desired to obtain the best approximation of f2(x) from the superposition function F(x). The best approximation of f2(x) is attained by using the wavelength region of x where the relative influence of f1(x) and f3(x) on F(x) is small. Therefore, the best approximation of f2(x) is found in the region of wavelength x where f2(x) has a value that is higher than its FWHM. That region is used to least square fit the function defined by the Transmission Formula to the recorded values of F(x) to determine $\lambda_{02}$, Transmission($\lambda_{02}$) and FWHM($\lambda_{02}$). Once f1(x), f2(x) and f3(x) are individually estimated in the manner described, the theoretical value of F(x) can be calculated for any value of wavelength x.

Additionally, it should be noted that the optical noise at a given wavelength can be calculated by subtracting the calculated value of F(x), for that wavelength, from the light intensity measured at that wavelength.

Figure 3:
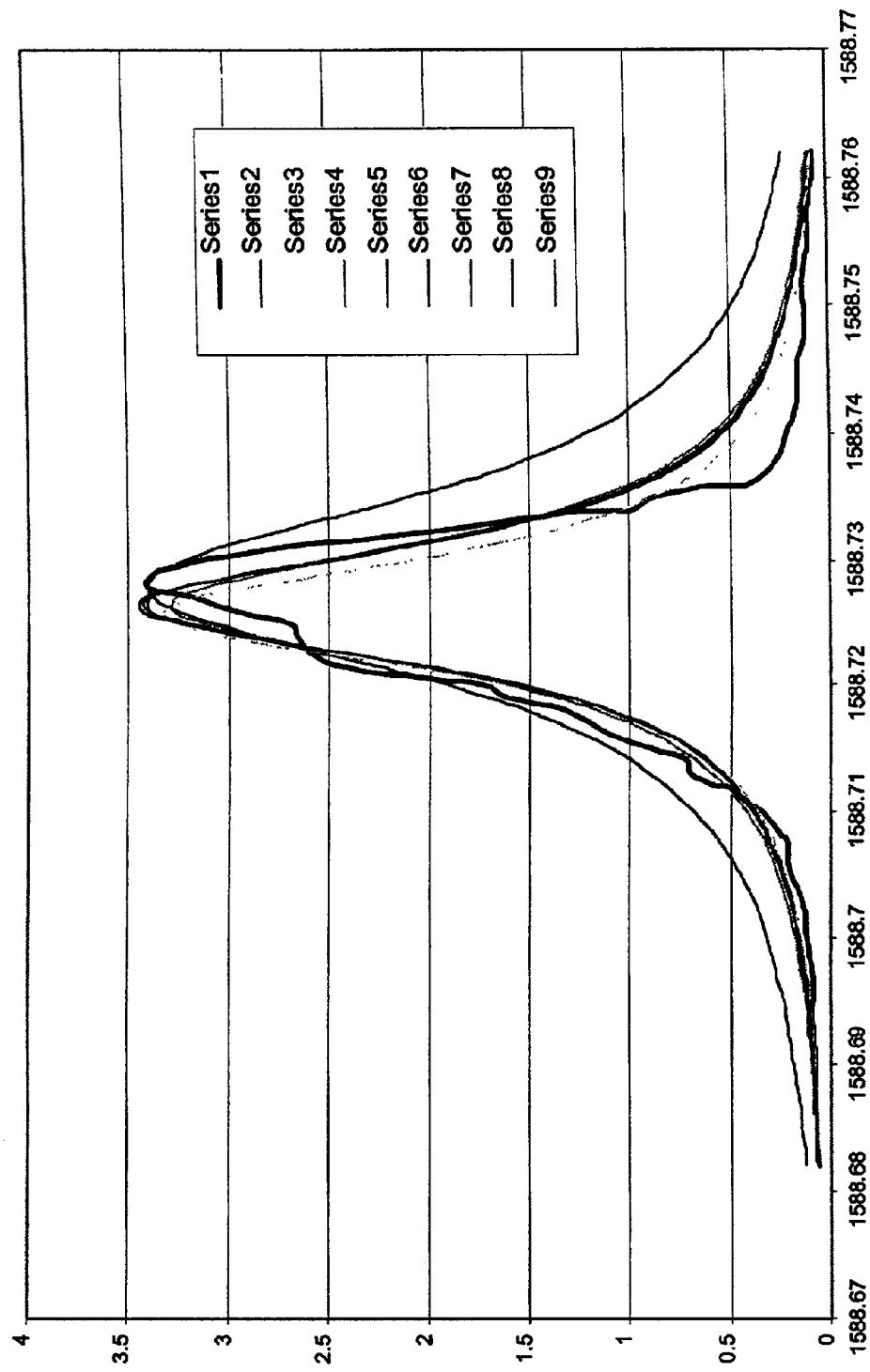
FIG. 3 depicts raw data obtained by sweeping a tunable laser source over one passband of the Fabry-Perot etalon of FIG. 1.

Referring now to FIG. 3, raw data obtained by sweeping a tunable laser source over one passband of Fabry-Perot etalon 10 is depicted. It will be noted that the shape of the passband is significantly distorted by optical noise. A nonlinear least squared fit, such as Levenberg-Marquardt nonlinear least square fit, to the Transmission Formula function can be employed to restore the shape of the passband, as depicted. The initial guess of parameters obtained from the raw data resulted in the Series 2 curve. Series 3,4,5,6,7,8,9 curves show the result of the first, second, third, fourth, fifth, sixth and seventh iterations of the fit. Third and higher iterations are very close to each other. That result means that, in this instance, the nonlinear least square fit converged in three iterations. It is clear from the picture that, as a result of the averaging power of the fit, a nonlinear least square fit gives a much closer description of the transmission peak than the one that was obtained from the raw data.

Figure 4:
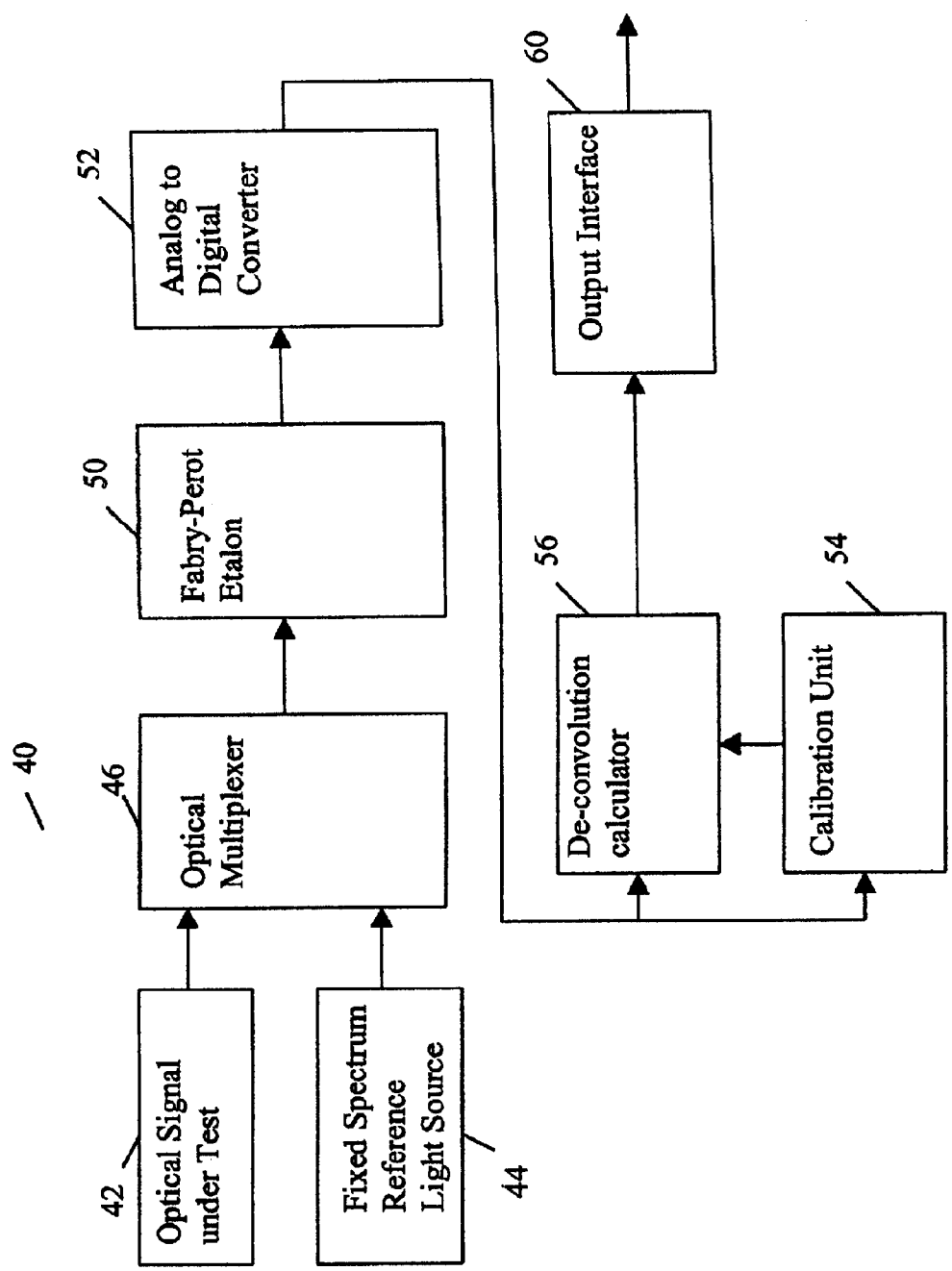
FIG. 4 depicts a block diagram of a Fabry-Perot Etalon based measurement system according to an aspect of the present invention.

Referring now to FIG. 4, a functional block diagram of a Fabry-Perot Etalon based measurement system 40 with dynamic calibration according to an aspect of the present invention, is depicted. The measurement system 40 includes an optical signal under test 42 and a fixed spectrum reference light source 44 that are both input to an optical multiplexer 46. The optical multiplexer 46 selects between the two input optical signals 42 and 44 (depending if the system is being calibrated or performing a measurement) and conveys the selected signal to Fabry-Perot Etalon 50. The output signal from the Febry-Perot Etalon 50 is conveyed to an analog to digital converter (ADC) 52. The digitized signal output from ADC 52 is passed to a calibration unit 54 and to a deconvolution calculator 56. The result of the operation is transmitted to an output interface 60.

For the present measurement system 40, it is convenient to use a fixed wavelength laser or a combination of a few lasers as reference light source 44. Because the spectral width of the fixed wavelength laser is much smaller than the width of the Fabry-Perot filter peak, the convolution of the two can be well approximated by expressions $f_1(x)$, $f_2(x)$ and $f_3(x)$. Also, for the static measurement method using a fixed Fabry-Perot cavity laser, a synchronized detector can be used to characterize the etalon transmission. In this case, the resultant transmission can again be described by $f_1(x)$, $f_2(x)$ and $f_3(x)$.

The Calibration Unit 54 separates the reference signal from the other signals and performs a non-linear least square fit of the digitized transmission data resulting in the determination of the functional parameters of the etalon, FWHM ($\lambda_0$) and Transmission($\lambda_0$) ). These parameters are then introduced into the De-convolution Calculator 56. The optical signal under test 42 also creates an interference spectrum when applied to the Fabry-Perot Etalon that is digitized and fed into De-convolution Calculator 56. The true spectrum of the optical signal under test 42 is determined by de-convolving the digitized transmission data with the Fabry-Perot Etalon Transmission Function by de-convolution Calculator 56.

Figure 5:
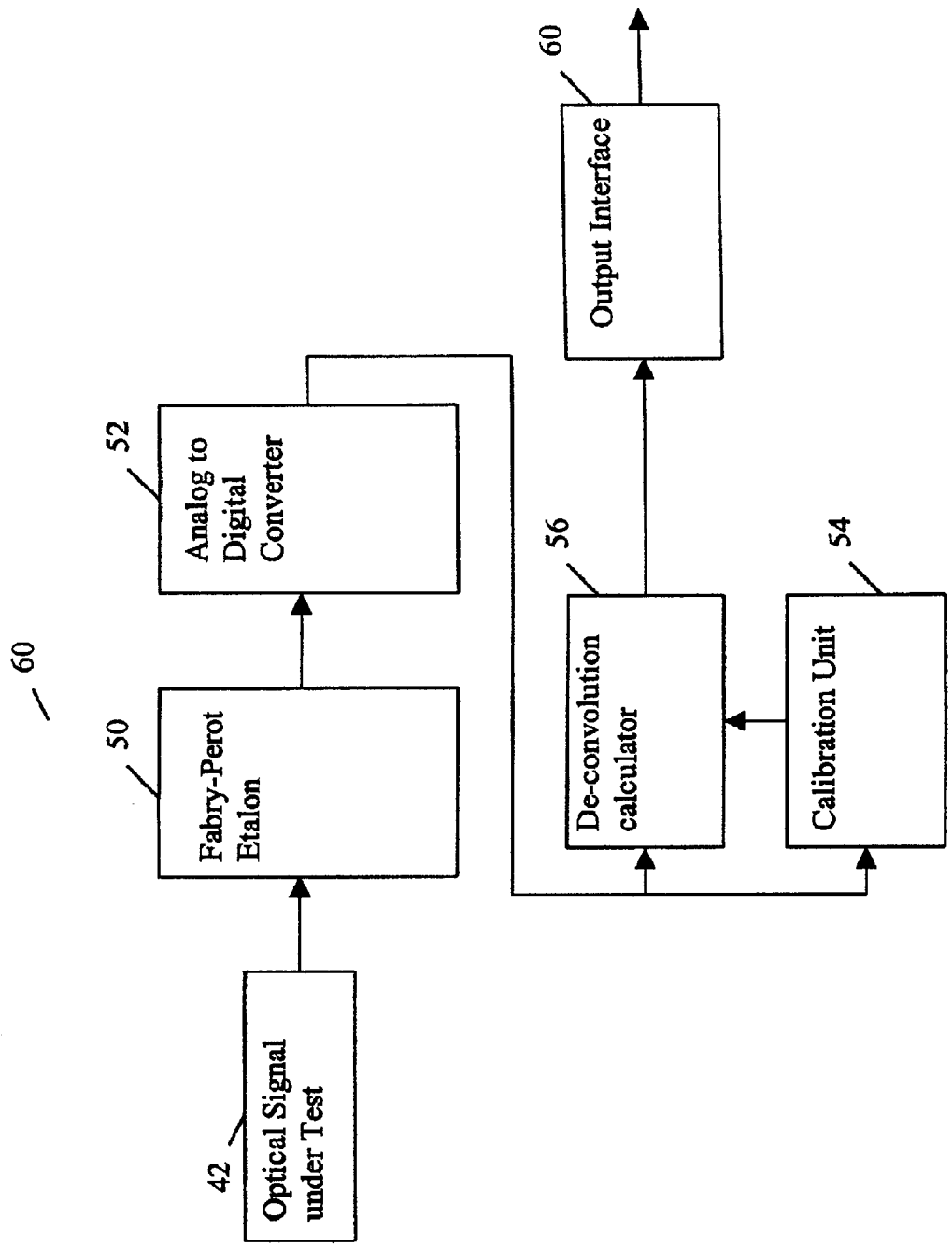
FIG. 5 depicts a further embodiment of a Fabry-Perot Etalon based measurement system according to an aspect of the present invention.

FIG. 5 shows a functional block diagram of a further embodiment of a light spectrum measurement system 60. The measurement system 60 is used to measure the spectrum of a DWDM transmission. In this apparatus 60, no light reference signal is used based upon the assumption that the particular Fabry-Perot Etalon is stable enough to ensure the necessary wavelength measurement accuracy. The transmission at the center wavelengths of the peaks of the signal is also considered stable. However, the width of the transmission peaks vary and that is what is evaluated using the measurement system.

In general, the main difference between the measurement system 40 (FIG. 4) and measurement system 60 (FIG. 5) is that in the measurement system 40 the calibration of the etalon is performed using the least square fit of the interference pattern from a special calibration light source. In measurement system 60 the interference pattern of the optical signal under test 42 is directly used for calibration.

More specifically, in measurement system 60 the light goes directly to the Fabry-Perot etalon 50 and creates an interference pattern. A digital signal, representing this interference pattern, is fed into the De-convolution Calculator 56 and the Calibration Unit 54. The purpose of calibration in this measurement scheme is to provide information about the etalon parameters to the De-convolution calculator 56. The Calibration Unit 54 estimates the parameters of the Fabry-Perot etalon using a least square fit function on the signal described by $f_1(x)$, $f_2(x)$ and $f_3(x)$.

Knowing the expected parameters of the Fabry-Perot Etalon 50 allows the De-convolution Calculator 56 to perform the optimum filtration of the signal under test 42 such that the influence of noise is reduced and the accuracy of optical signal wavelength and power measurement are maximized Such a scheme also allows for the calculation of optical noise and signal-to-noise ratios independently from the shape of the etalon.

It will be recognized by those of ordinary skill in the art that the estimation of the etalon transmission function parameters, as described herein, can also be performed by the methods other than least square fit. For example, such methods include determining the shape of transmission peaks at selected points in the wavelength domain by determining the centre wavelength, peak transmission and full-width-half-max parameters through interpolation and/or extrapolation.

Additionally, in a further embodiment of the present invention, an Etalon other than a Fabry-Perot Etalon can be used to create the interference pattern described herein. Where the passband of the selected etalon can be described by an analytical function, the invention can be used to estimate that function and calculate the spectrum of the light being measured.

Further, the number of wavelength points where the passband evaluation is performed can vary depending on how monotonous the behavior of the etalon is. Characterization of a Fabry-Perot etalon may be done every measurement cycle (referred to as dynamic calibration) or to improve the response time of the measurement device once in a few cycles. The described procedure can also be used for bench calibration.

It will be recognized that many configurations similar to those described above can be designed using different values, combinations and architectures which will yield the same results as the claimed invention. Thus, while this invention has been particularly shown and described with references to preferred embodiments herein, it is understood by those skilled in the art that various changes in form and details may be made therein without departing from the scope of the invention as defined by the appended claims.

What is claimed is:

1. A method for calibrating an etalon based optical system, comprising:

applying an optical signal, having a known spectral shape, to the etalon;

Recording the transmission peaks resulting from application of the optical signal;

analyzing the shape of the transmission peaks at selected points in the wavelength domain by determining the centre wavelength, peak transmission and full-width-half-max parameters defining the behavior of the peak transmission and full-width-half-max parameters over the entire wavelength range by interpolating between the selected points and/or extrapolating beyond the points; and applying the center wavelength, peak transmission and full-width-half-max parameters to a formula that approximates the response of the etalon and that is dependent upon the center wavelength, peak transmission and full-width-half-max parameters so that the etalon is calibrated.

2. A method for calibrating an etalon based optical system, as described in claim 1, further comprising:

determining the peak transmission by performing a least square fit of the shape of the resulting transmission peaks to said formula.

3. A method for calibrating an etalon based optical system, as described in claim 1, wherein the formula approximating the etalon is $$\text{Transmission}(\lambda) := \frac{\text{Transmission}(\lambda_0)}{1 + \left[\frac{[2 \cdot (\lambda - \lambda_0)]}{FWHM(\lambda_0)}\right]^2}.$$

4. A method for calibrating an etalon based optical system, as described in claim 1, wherein the etalon is a tunable etalon.

5. A method for calibrating an etalon based optical system, as described in claim 1, wherein the etalon is a fixed etalon.

6. A method for calibrating an etalon based optical system, as described in claim 1, wherein the etalon is a Fabry-Perot etalon.

7. An apparatus for calibrating an etalon based optical system, comprising:

means for applying an optical signal, having a known spectral shape, to the etalon;

means for recording the transmission peaks resulting from application of the optical signal;

means for analyzing the shape of the transmission peaks at selected points in the wavelength domain by determining the centre wavelength, peak transmission and full-width-half-max parameters by interpolating between the points and/or extrapolating beyond the points; and means for applying the center wavelength, peak transmission and full-width-half-max parameters to a formula that approximates the response of the etalon and that is dependent upon the center wavelength, peak transmission and full-width-half-max parameters so that the etalon is calibrated.

8. An apparatus for calibrating an etalon based optical system, as described in claim 7, further comprising:

means for determining the peak transmission by performing a least square fit of the shape of the resulting transmission peaks to said formula.

9. An apparatus for calibrating an etalon based optical system, as described in claim 7, wherein the formula approximating the etalon is $$\text{Transmission}(\lambda) := \frac{\text{Transmission}(\lambda_0)}{1 + \left[\frac{[2 \cdot (\lambda - \lambda_0)]}{FWHM(\lambda_0)}\right]^2}.$$

10. An apparatus for calibrating an etalon based optical system as described in claim 7, wherein the etalon is a tunable etalon.

11. An apparatus for calibrating an etalon based optical system, as described in claim 7, wherein the etalon is a fixed etalon.

12. An apparatus for calibrating an etalon based optical system, as described in claim 7, wherein the etalon is a Fabry-Perot etalon.

* * * * *